United States Patent [19]

Yoshimura et al.

[11] Patent Number: 5,546,367
[45] Date of Patent: Aug. 13, 1996

[54] METHOD AND DISC APPARATUS FOR REPRODUCING INFORMATION SIGNALS AND INCLUDING COMPENSATION FOR DISK TILT-BASED PLAYBACK DETERIORATION

[75] Inventors: Shunji Yoshimura; Toru Okazaki, both of Tokyo, Japan

[73] Assignee: Sony Corporation, Tokyo, Japan

[21] Appl. No.: 368,873

[22] Filed: Jan. 5, 1995

[30] Foreign Application Priority Data

Jan. 10, 1994 [JP] Japan ................................. 6-001015

[51] Int. Cl.⁶ ................................................. G11B 7/00
[52] U.S. Cl. ........................ 369/44.32; 369/54; 369/124
[58] Field of Search ........................... 369/44.32, 44.33, 369/44.34, 124, 112, 44.41, 44.35, 44.36, 54; 250/201.5

[56] References Cited

U.S. PATENT DOCUMENTS 5,001,690  3/1991  Kamiya et al. ..................... 369/44.32

FOREIGN PATENT DOCUMENTS 0313818  5/1989  European Pat. Off. ............ 369/44.32
0397354  11/1990  European Pat. Off. .
0569597  11/1993  European Pat. Off. .

*Primary Examiner*—W. R. Young
*Assistant Examiner*—Thang V. Tran
*Attorney, Agent, or Firm*—Limbach & Limbach

[57] ABSTRACT

An apparatus for reproducing an optical disc in which a light beam radiated from a light source in an optical pickup is radiated to an optical disc and the return light from the disc is detected by a photodetector provided within the optical pickup for reproducing the information signal recorded on the optical disc. A detection output of the return light from the optical disc as detected by the optical pickup is supplied to a waveform equalizer and to a quantity of skew-calculating circuit for detecting the quantity of skew of the optical disc. An output of the waveform equalizer is further supplied to a demodulating circuit. An output of the quantity of skew calculating circuit is inverted in polarity by a polarity inverting circuit and thence supplied to an integrating circuit an output of which is supplied to a control circuit for controlling a correction device for correcting the disc skew. The control circuit for controlling a correction device for correcting the disc skew drives a disc skew correcting circuit provided in the optical pickup in a direction of correcting the tangential skew of the track on the optical disc.

21 Claims, 14 Drawing Sheets

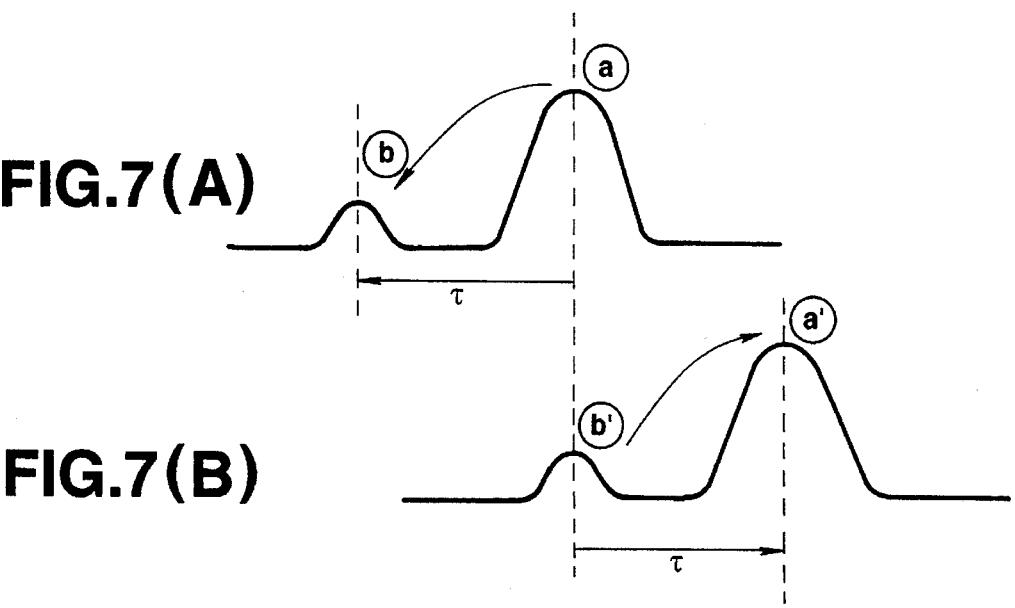
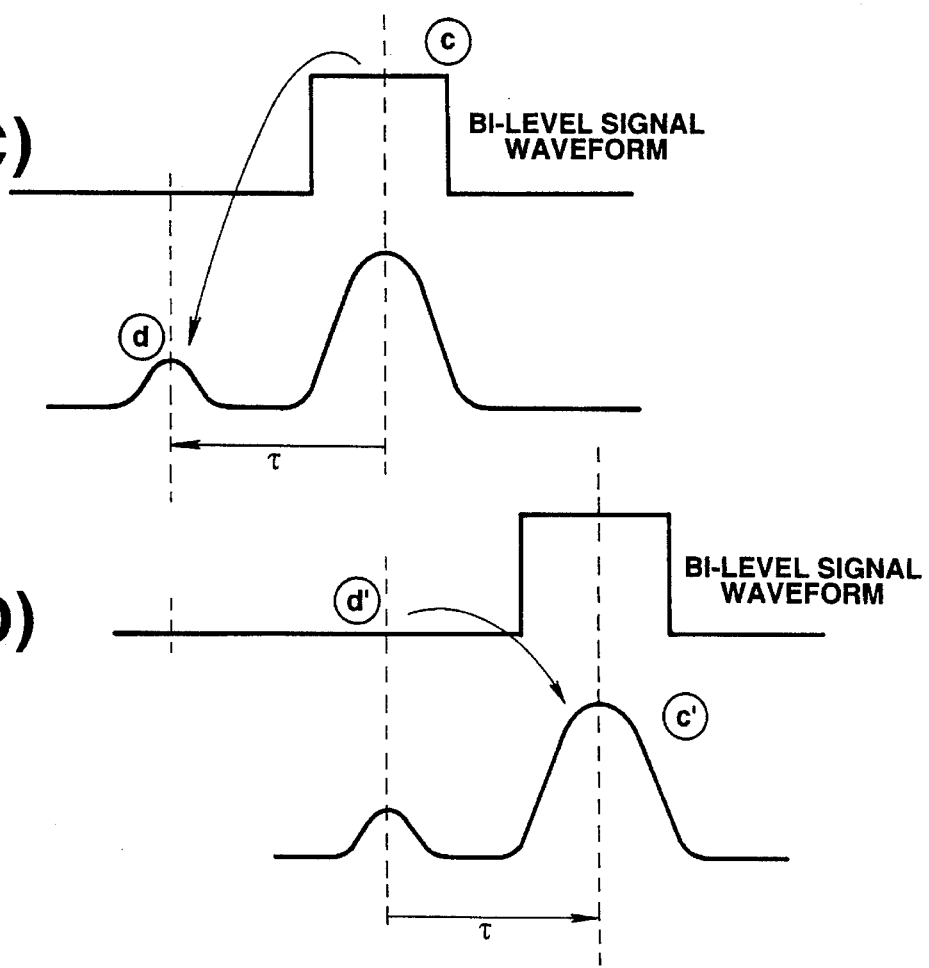
FIG.7(A)
FIG.7(B)
FIG.7(C)
FIG.7(D)

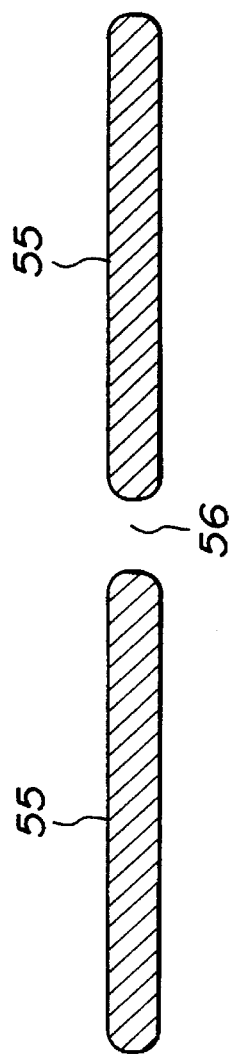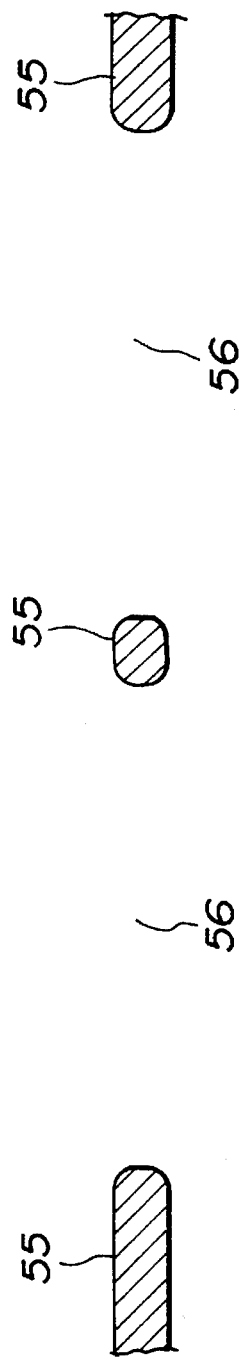
FIG.14 REFERENCE PIT PATTERN OF OPTICAL DISC
FIG.15 REFERENCE PIT PATTERN OF OPTICAL DISC

METHOD AND DISC APPARATUS FOR REPRODUCING INFORMATION SIGNALS AND INCLUDING COMPENSATION FOR DISK TILT-BASED PLAYBACK DETERIORATION

BACKGROUND OF THE INVENTION

1. Field of the Invention

This invention relates to a method and apparatus for reproducing information signals from an optical disc by radiating the light to the disc. More particularly, it relates to such method and apparatus adapted for compensating for deterioration in playback signals produced by tilt in the optical disc.

2. Description of Related Art

An optical disc is a recording medium having an extremely wide field of application as a package medium for information signals. On the optical disc, there are recorded data strings modulated in accordance with a pre-set modulation system, such as eight-to-fourteen modulation (EFM).

FIG. 1 shows a portion of a replay-only optical disc 61.

On the replay-only optical disc 61, there are recorded data strings extending along a spiral information track 62 in the form of pits 64. For reproducing the data strings recorded on such optical disc 61 as information signals, a light beam is radiated from a light source, preferably a laser diode (semiconductor laser), and changes in the volume of the reflected light from the disc are detected. Specifically, when the light beam is radiated on the information track 62, the light is reflected from a mirror portion 63 free of pits 64 in a larger quantity, while it is reflected from the pits 64 in a lesser quantity. In an optical disc reproducing apparatus, such as a compact disc player or a video disc player, the information signals are reproduced by taking advantage of such change in the light quantity.

The optical disc reproducing apparatus includes an optical pickup having a laser diode as the light source, a photodetector for detecting the quantity of the reflected light, and an optical system made up of a collimator lens, an objective lens and a beam splitter for collecting the light beam from the laser diode on the information track 82 on the optical disc 81 and for routing the reflected light from the optical disc 81 to the photodetector. The frequency characteristics of the optical pickup can be defined in terms of the spatial frequency. The frequency characteristics are generally represented using a function known as a modulation transfer function (MTF). The optical cut-off frequency fc of the MTF is primarily represented by an equation $$fc = 2NA/\lambda \quad (1)$$

wherein $\lambda$ denotes the wavelength of the light of the light source and NA the numerical aperture of the objective lens employed in the optical pickup.

If the pits 64 and the mirrors 63 are alternately recorded at a frequency not less than the cut-off frequency fc shown in the equation (1), it becomes wholly impossible to read out information signals.

In addition, the MTF gain characteristics are not flat up to the cut-off frequency fc, but are decreased monotonously. The result is the band-limited playback waveform.

Since the optical disc is a recording medium, it is convenient if more information signals can be recorded on the same size disc. However, since there is a limitation imposed by MTF on the spatial frequency that can be read optically, it is not that easy to raise the recording density for the same system.

For realizing the higher recording density, either the numerical aperture NA of the optical lens of the optical pickup is increased, or the wavelength $\lambda$ of the light of the light source is diminished. It is technically most difficult to reduce the wavelength $\lambda$ of the light of the light source in view of the necessity of keeping the small size of the laser unit. Thus the technique of enlarging the numerical aperture NA of the objective lens for increasing the recording density of the optical disc is under investigation.

Judging from the cut-off characteristics of the MTF, it may be contemplated that the larger the numerical aperture NA of the objective lens, the smaller becomes the beam spot of the light beam, thus possibly leading to improved resolution and higher recording density. However, although the higher recording density may be achieved by increasing the numerical aperture NA, the apparatus is deteriorated in operational stability. By far the most inconvenient is the fact that the allowance for skew which is the disc tilt is drastically lowered by enlarging the numerical aperture NA. The optical disc surface cannot be machined to a geometrically satisfactory planar surface, while the disc may be warped in the course of manufacture. On the other hand, an optical disc cannot necessarily be set in a ideally horizontal position when mounted on the optical disc reproducing apparatus. Consequently, disc skew cannot be removed completely and hence the numerical aperture cannot be increased without restrictions.

Specifically, if the optical disc is tilted relative to the optical axis of the objective lens, the coma aberration is generated in proportion to approximately the third power of the numerical aperture NA and to approximately the first power of the quantity of skew $\Theta$. If represented by, for example, the Seitel's aberration coefficient formula, the coma aberration is approximately $$t \cdot (n^2 - 1)/2n^3 \cdot NA^3 \quad (2)$$

for a sufficiently small skew quantity $\Theta$.

In the above formula, t denotes the thickness of an optical disc substrate and n the refractive index of the optical disc substrate. If, for example, an objective lens with a numerical aperture of 0.6, which is 1.33 times as large as the numerical aperture of 0.45 of the objective lens of the optical pickup of, for example, a compact disc player, is employed, the coma aberration 2.37 times as large as that of the compact disc is generated despite the fact that the quantity of skew is on the same order of magnitude as that of the compact disc. Due to tilt of the reflection surface, that is wave front distortion, the light spot formed on the optical disc becomes non-symmetrical, such that it becomes difficult to extract the signal sufficiently.

Thus it has been envisaged to detect the skew and to make adaptive skew correction by a skew correcting device depending on the detection signal.

First, a skew sensor for detecting the skew is explained by referring to FIG. 2.

The skew sensor is made up of a light emitting diode (LED) 71, a two-segment photodetector 72 and a lens 73. The lens 73 may be resin-molded as-one with the LED 71 and the two-segment photodetector 72. The light beam radiated from the LED 71 on the optical disc 61 is reflected thereby to form a light spot 74 on the two-segment photodetector 72.

If the optical disc 61 is tilted, the light spot 74 is moved on the two-segment photodetector 72 in a direction of segment separation as indicated by an arrow LR in FIG. 2. The differential output of the two-segment photodetector 72 is produced by an additive node 75. The differential output is supplied as a skew error signal to the skew correction device.

An output signal of the skew sensor shown in FIG. 2 is shown in FIG. 3. The skew sensor shown in FIG. 2 utilizes the linear range of the output signal waveform shown in FIG. 3.

The skew correction device utilizes the output signal of the above skew sensor for adaptively controlling the optical disc skew. As such skew correction device, there is known a device employing two correction plates.

The skew correction device drives the two correcting pates to an optimum state, using the skew error signal outputted by the skew sensor, in order to render the optical disc reproducing apparatus strong against skew up to a certain quantity of skew. This it is possible with the optical disc reproducing apparatus to enlarge the numerical aperture NA of the objective lens to some extent.

Meanwhile, for reproducing the optical disc using the optical disc reproducing apparatus, as described above, the skew sensor is employed for producing the information as to the degree of tilt of the optical disc. However, the skew sensor is not high in accuracy, while an error may be produced in the skew sensor offset or an error may be produced due to changes in temperature. Unless the skew sensor is improved significantly in mounting accuracy, the measurement error tends to be produced since the optical axis of the light from the light source is coincident on only rare occasions with the optical axis of the LED of the skew sensor. Due to these factors, it is likely that the correct degree of tilt cannot be obtained with the skew sensor.

For obtaining the tilt of the disc portion illuminated with the beam spot, the skew sensor needs to be mounted on the opposite side of the optical disc with respect to the optical pickup. However, in such case, the optical disc reproducing apparatus is increased in size contrary to the demand for reduction in size and weight of the device.

In addition, with an optical disc reproducing apparatus for reproducing information signals by introducing an optical disc cartridge comprising an optical disc contained in a main cartridge body, or with an optical disc reproducing apparatus aimed at size reduction, the skew sensor is necessarily disposed on the same side of the optical disc with respect to the optical pickup. In such case, it is possible to obtain the tilt of the surface in the vicinity of the disc portion irradiated with the beam spot, while it is not possible to obtain the tilt of the disc portion itself. Consequently, should there be any distortion in the disc surface itself, the disc portion irradiated with the beam spot and the disc portion measured by the skew sensor become different in tilt, such that it may occur that correct tilt magnitude cannot be recognized.

OBJECTS AND SUMMARY OF THE INVENTION

In view of the foregoing, it is an object of the present invention to provide a method and apparatus for reproducing an optical disc whereby the tilt of the optical disc may be found accurately and the disc tilt can be corrected highly accurately from the magnitude of the disc tilt.

It is another object of the present invention to provide an apparatus for reproducing an optical disc which may be reduced in size and weight.

In one aspect, the present invention provides a disc apparatus for reproducing information signal recorded on a disc-shaped recording medium comprising information readout means for reading out the information signal from the disc-shaped recording medium, means for calculating the quantity of skew of the disc-shaped recording medium by calculating the correlation between the information signal read out from the disc-shaped recording medium and a signal obtained on shifting the information signal a pre-set time, and means for correcting the skew of the disc-shaped recording medium in accordance with the quantity of skew obtained by the skew calculating means.

The skew calculating means comprises first delay means for delaying the information signal by the pre-set time, second delay means for further delaying an output of the first delay means by the pre-set time, means for converting an output signal of the first delay means into a bi-level signal and outputting the bi-level signal, first correlation calculating means for calculating the correlation between the information signal and the bi-level signal, second correlation calculating means for calculating the correlation between an output signal of the second delay means and the bi-level signal, and difference means for calculating a difference between a correlation value obtained by the first correlation means and a correlation value obtained by the second correlation means.

In another aspect, the present invention provides a method for reproducing information signals recorded on the disc-shaped recording medium comprising a first step of reading out information signals from the disc-shaped recording medium, a first delay step of calculating the quantity of skew of the disc-shaped recording medium by calculating the correlation between the information signal read out from the disc-shaped recording medium and a signal obtained on shifting the information signal a pre-set time, and a third step of correcting the skew of the disc-shaped recording medium in accordance with the quantity of skew obtained by the skew calculating means.

The above second step may comprise a first delay step for delaying the information signal by the pre-set time, a second delay step for further delaying an output of the first delay means by the pre-set time, a bi-level step for converting an output signal of the first delay means into a bi-level signal and outputting the bi-level signal, a first correlation calculating step for calculating the correlation between the information signal and the bi-level signal, a second correlation calculating step for calculating the correlation between an output signal of the second delay means and the bi-level signal, and a difference calculating step for calculating a difference between a correlation value obtained by the first correlation means and a correlation value obtained by the second correlation means.

BRIEF DESCRIPTION OF THE DRAWINGS

FIGS. 7A to 7D illustrate the operation of a bi-level circuit.

FIG. 14 illustrates a reference pit pattern for an optical disc the frame structure for which is shown in FIG. 13.

FIG. 15 illustrates another reference pit pattern for an optical disc the frame structure for which is shown in FIG. 13.

DETAILED DESCRIPTION OF THE PREFERRED EMBODIMENTS

Figure 1:
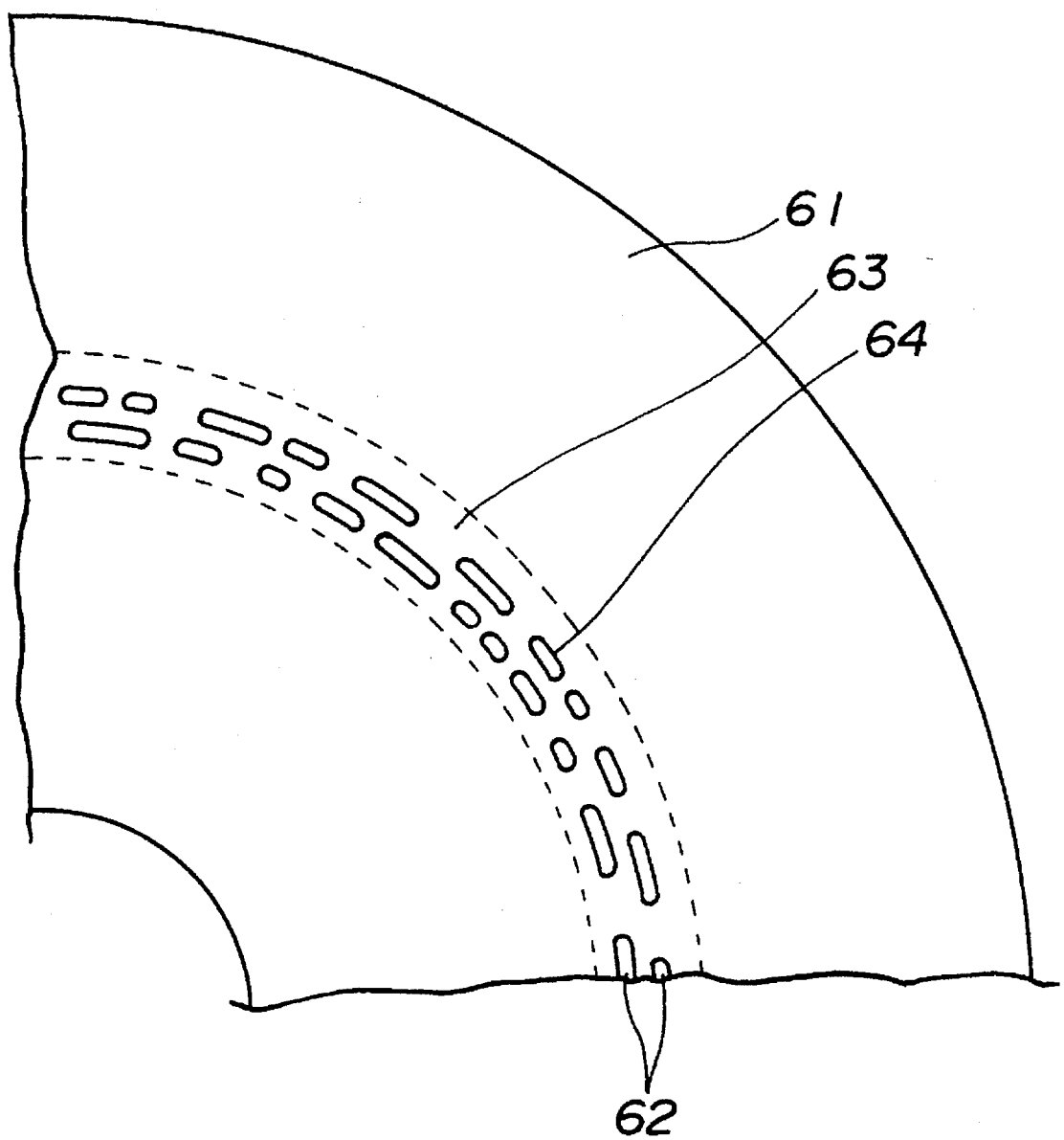
FIG. 1 illustrates the structure of an optical disc.
Figure 2:
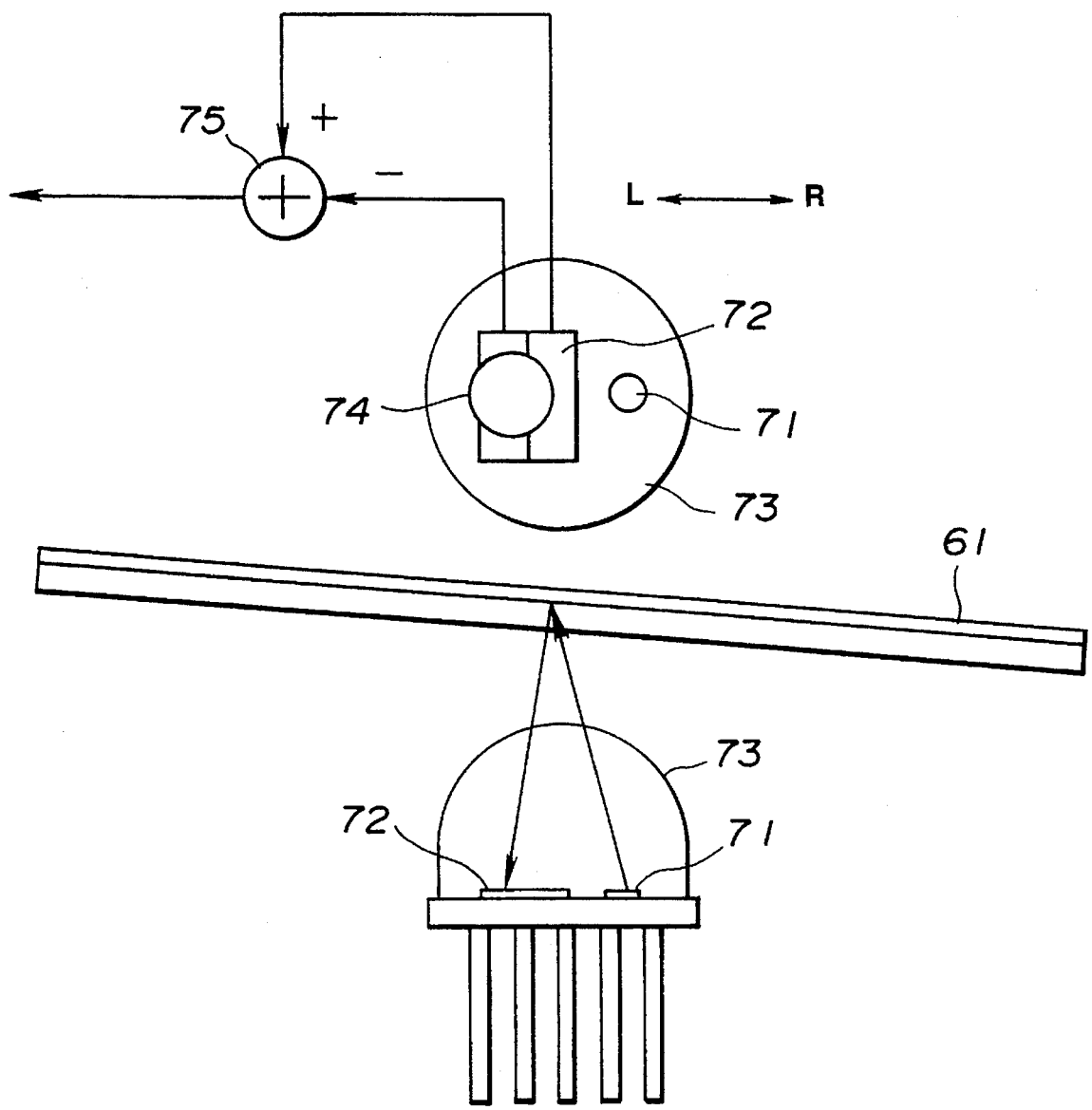
FIG. 2 schematically illustrates an arrangement of a skew sensor.
Figure 3:
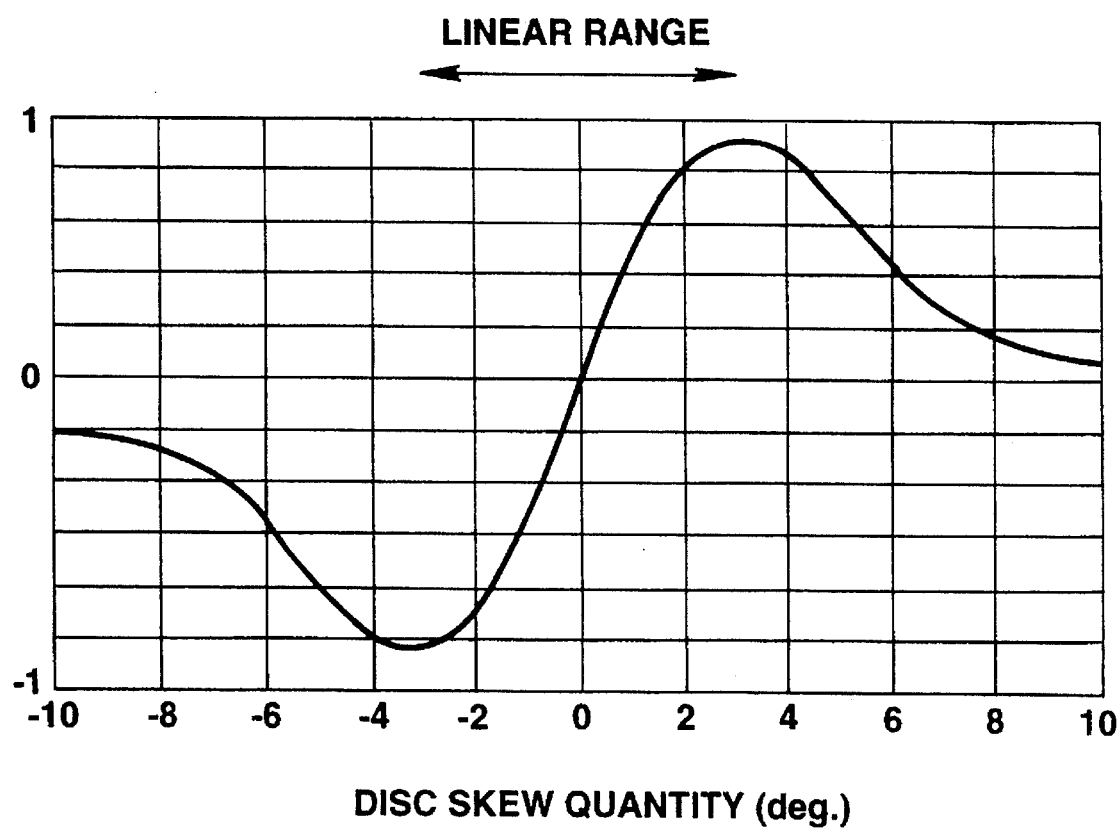
FIG. 3 is a graph showing the relation between an output signal of a skew sensor and the tilt in the optical disc.

Referring to the drawings, preferred embodiments of the present invention will be explained in detail.

The present embodiment is directed to an optical disc apparatus for reproducing an optical disc 1 having recorded thereon data strings comprising the information such as digitized audio signals or video signals modulated in accordance with a pre-set modulation system, such as EFM. Such optical disc 1 may be any one of a replay-only optical disc having the data strings recorded in the form of pits, a write-once optical disc having the data strings recorded thereon in the form of the presence or absence of a reflective film or deformation or changes in reflectance, a overwrite optical disc having data strings recorded thereon by inversion of magnetization, or a phase-transition optical disc. Although the replay-only optical disc is explained herein as an optical disc, any other optical disc described above may also be employed.

The information recorded on the optical disc 1 is read out by an optical pickup 2. The optical pickup 2 has a laser diode as a light source, such as a semiconductor laser, a detector for detecting the quantity of the reflected laser light, and an optical system made up of a collimator lens, an objective lens and a beam splitter for conducting the laser beam from the laser diode on the information track on the optical disc 1 and also conducting the reflected laser light from the optical disc 1 to the detector. The optical pickup 2 has a skew correction device 8 for correcting the skew of the optical disc 1.

Figure 5:
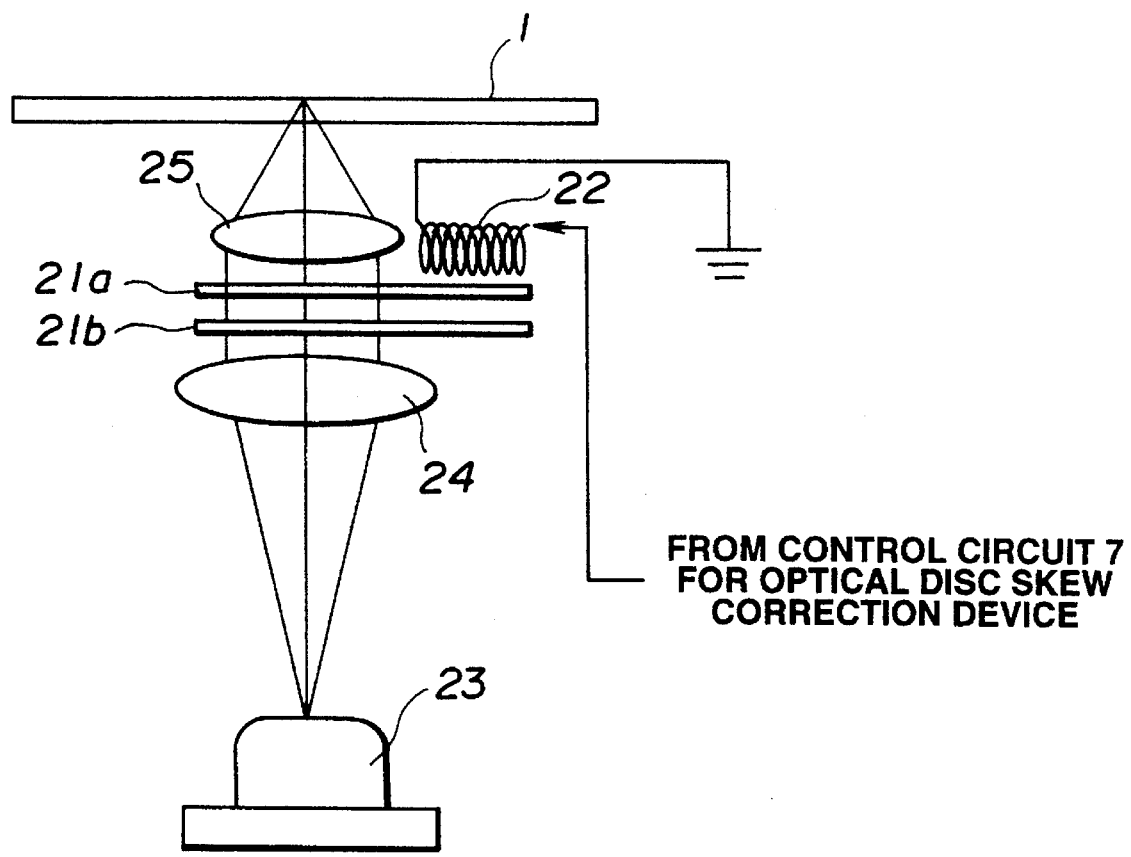
FIG. 5 is a schematic side view showing an arrangement of a skew correcting device in an optical pickup in the embodiment shown in FIG. 4.

An output of the optical pickup 2 is fed to a waveform equalizer 3 and to a skew quantity calculating circuit 4 for detecting the quantity of skew of the optical disc 1. An output of the waveform equalizer 3 is fed to a demodulating circuit. An output of the skew quantity calculating circuit 4 is inverted in polarity by a polarity inverting circuit 5 and thence fed to an integrating circuit 8, an output of which is fed to a control circuit 7 for controlling the optical disc skew correcting device. The circuit 7 for controlling the optical disc skew correcting device drives an optical disc skew correction device 8 provided in the optical pickup 2 in a quantity proportional to the input signal level in a direction of correcting the skew in the tangential direction of the track on the optical disc 1. A optical disc skew correction device 8 may be a coma aberration correcting rotary plate, a coma aberration correcting operating plate or an electronic optical device. Referring to FIG. 5, an illustrative construction of the optical disc skew correction device 8 employing a pair of correcting plates is now explained by referring to FIG. 5.

The illustrative construction of the disc skew correcting device 8 comprises a pair of correcting plates 21a, 21b, a position sensor, not shown, for position-controlling the correction plates 21a, 21b, and an electro-optical driving device 22.

A laser light beam radiated from a laser diode 23 as a light source for the optical pickup 2 is collimated by a beam splitter, not shown, and a collimator lens 24, so as to be converged by an objective lens 25. The laser light thus converged is reflected back by the optical disc 1 so as to be re-incident on the objective lens 25. The playback RF signals obtained via a photodetector, not shown, is supplied to the waveform equalizer 3 and to the skew quantity calculating circuit 4. The skew quantity obtained by the skew quantity calculating circuit 4 is supplied via the polarity inverting circuit 5 and the integrating circuit 8 to the control circuit 7 for the disc skew correcting device. The control circuit 7 for the disc skew correcting device controls the optical disc skew correcting device 8 for correcting the skew in the tangential direction of the track on the optical disc 1n an amount proportional to the input signal level, as described above.

The correcting plates 21a, 21b are non-spherical in shape, that is, convex and concave towards above and towards below, respectively.

These correcting plates 21a, 21b are each driven symmetrically to each other about the optical axis within a plane perpendicular to the optical axis by the electro-optical driving device 22. By the correcting plates 21a, 21b being thus moved symmetrically, the coma-aberration similar to that produced by the disc skew of the optical disc 1 can be generated on the pupil surface of the objective lens 25.

It is assumed that if, with the present embodiment, the optical disc skew correcting device 8 is fed with and driven by a positive-polarity signal, a positive-polarity signal is outputted from the skew quantity calculating circuit 4.

As for the correcting pates 21a, 21b, it is possible to secure the correcting plate 21b and to drive only the correcting plate 21a so that the distance of relative displacement between the correcting plates 21a and 21b is a pre-set distance.

The system comprising the skew quantity calculating circuit 4, polarity-inverting circuit 5, integrating circuit 8, control circuit 7 for the disc skew correcting device and the optical disc skew correcting device 8 constitutes a first-order integration negative feedback channel. That is, the quantity of skew obtained after correction of the optical spot on the optical disc 1 for skew by the optical disc skew correcting device S and calculation by the skew quantity calculating circuit 4 using the playback signal from the optical pickup 2 by the light spot represents the residue of the correction performed by the optical disc skew correcting device 8. An inverted signal of such residue can be used for driving the optical disc skew correcting device 8 in a direction of canceling the residue. In addition, the inverted residue signal from the polarity inverting circuit 5 can be integrated by the integrating circuit 8 for removing noise components in the output of the skew quantity calculating circuit 4 or skew fluctuations in the high frequency range for performing stable skew correction. That is, since the first-order negative feedback circuit including an integrating circuit is equivalently a first-order high-pass filter. Since noise components are generally higher in frequency, these components may be removed by the high-pass filter.

The playback RF signals, which are the information signals read from the optical disc 1 by the optical pickup 2, are supplied to a polarity changeover circuit 11 and to a delay circuit 12. The delay circuit delays the playback RF signals by $\tau$ to supply the resulting delayed signal to a bi-level circuit 15 and to a delay circuit 13. The delay circuit 13 further delays the RF signal from the delay circuit 12 by $\tau$ to supply the further delayed signal to another polarity changeover circuit 14. The bi-level circuit 15 converts the playback RF signal from the delay circuit 12 into a corresponding bi-level signal. The bi-level playback RF signal is fed as a control signal to the polarity changeover circuits 11, 14 as control signals. When carrying out the bi-level conversion, it is necessary to set the threshold so that only the main spot exceeds the threshold.

The polarity changeover circuit 11 selects whether the playback RF signal is to be outputted in a non-inverted manner or in an inverted manner depending on the control signal received from the bi-level circuit 15. For example, if the signal received from the bi-level circuit 15 is "1" or "0", the playback RF signal is outputted in the non-inverted form or in the inverted form, respectively.

Assuming that the playback RF signal outputted from the delay circuit 12 is x(t) and a function representing the bi-level conversion id f(x), wherein the function f(x) is defined as f(x)–1 and f(x)=–1 for x≧0 and x<0, respectively, the output of the polarity changeover circuit 11 becomes $$x(t-\tau) \cdot f(x(t)) \tag{3}$$

as a result of the above processing. An output of the polarity changeover circuit 11 is supplied to a low-pass filter (LPF) 18.

The LPF 16 receives the signal outputted from the polarity changeover circuit 11 and extracts only the low-range component of the signal to transmit the extracted signal to a difference circuit 18. By such processing, an output signal of the polarity changeover circuit 11 becomes averaged over a time span. Consequently, the correlation between the signal x(t–$\tau$) of the equation (3) and the signal f(x(t)) is calculated. Thus the polarity changeover circuit 11 and the LPF 16 represent means for calculating the correlation between the playback RF signal read out by the optical pickup 2 and the bi-level signal converted from the playback RF signal delayed by $\tau$ by the delay circuit 12. Meanwhile, the correlation G(T) may be found by $$G(\tau) = \int_{-\infty}^{\infty} f(t) \cdot g(\tau - t) dt$$

LPF needs to be designed by setting the cut-off frequency so as to cover the time in which correlation exists.

The polarity changeover circuit 14 selects whether the playback RF signal received by the delay circuit 13 is to be outputted in a non-inverted manner or in an inverted manner depending on the control signal received from the bi-level circuit 15. For example, if the signal received from the bi-level circuit 15 is "1" or "0", the playback RF signal is outputted in the non-inverted form or in the inverted form, respectively.

Assuming that the playback RF signal outputted from the delay circuit 12 is x(t) and a function representing the bi-level conversion is f(x), wherein the function f(x) is defined as f(x)–1 and f(x)=–1 for x≧0 and x<0, respectively, an output of the polarity changeover circuit 11 becomes $$x(t+\tau) \cdot f(x(t)) \tag{4}$$

as a result of the above processing. An output of the polarity changeover circuit 14 is supplied to a low-pass filter (LPF) 17.

The LPF 17 receives the signal outputted from the polarity changeover circuit 11 and extracts only the low-range component of the signal to transmit the extracted signal to the difference circuit 18. By such processing, an output signal of the polarity changeover circuit 11 becomes averaged over a time span. Consequently, the correlation between the signal x(t) and the signal x(t+$\tau$) of the equation (4) is calculated. Thus the polarity changeover circuit 14 and the LPF 17 represent means for calculating the correlation between the bi-level signal converted from the playback signal delayed by $\tau$ by the delay circuit 12 and the playback RF signal further delayed by $\tau$ by the delay circuit 13.

The difference circuit 18 receives the averaged signals from the LPF 16 and the LPF 17 and calculates a difference which is outputted to a low-pass filter (LPF) 19. The LPF 19 receives an output signal from the difference circuit 18 and extracts only the low-range component of the signal which is supplied to the polarity inverting circuit 5 shown in FIG. 1.

The reason such bi-level is required is now scrutinized.

The situation which might arise if the bi-level conversion is not carried out is first considered.

Figure 6:
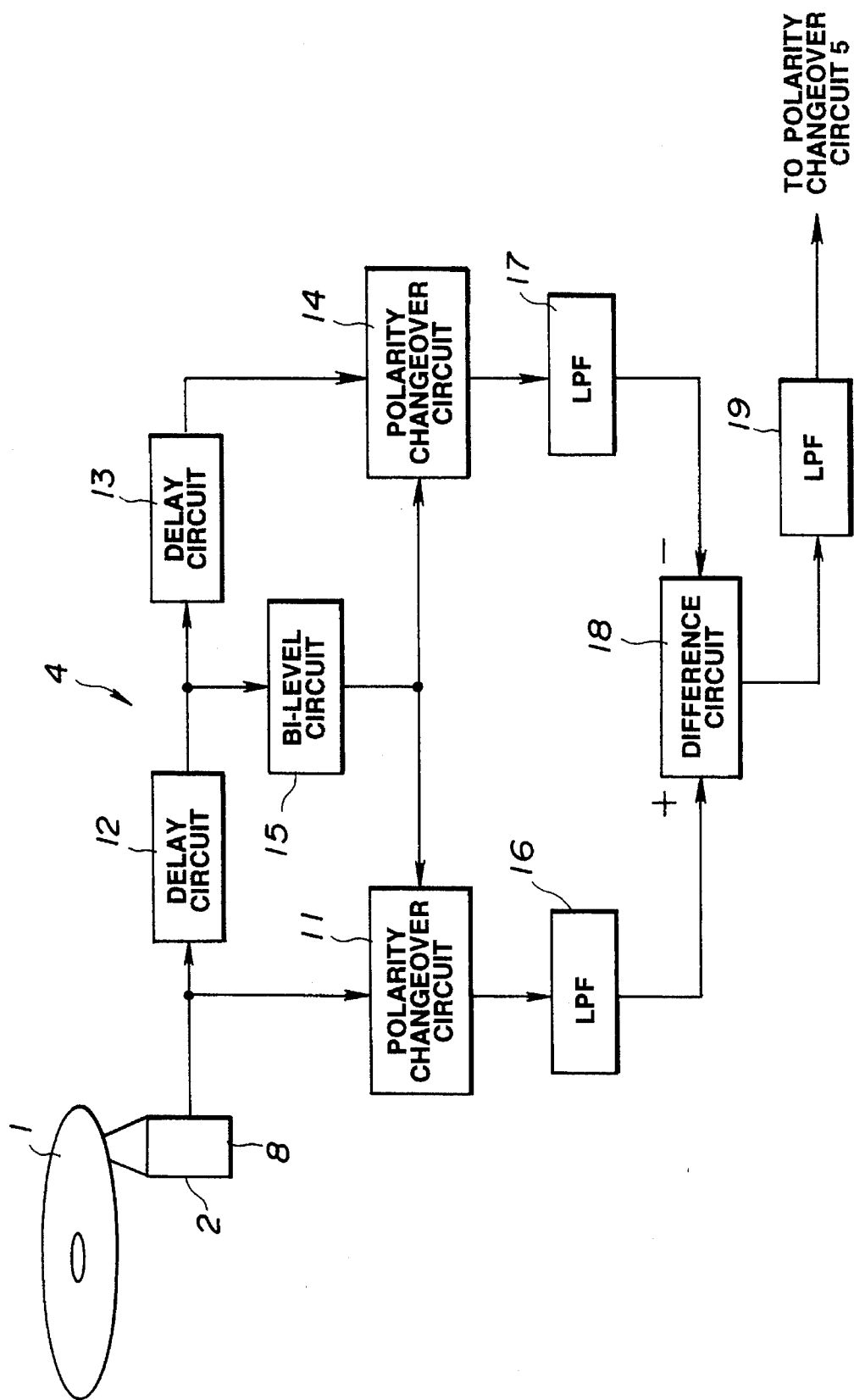
FIG. 6 is a schematic block diagram showing a skew quantity calculating circuit in the optical pickup in the embodiment shown in FIG. 4.

If the bi-level conversion is not made, an output of the circuit corresponding to the arrangement of FIG. 6 becomes as follows:

$$\int_{-\infty}^{\infty} f(t) \cdot f(\tau - t) dt - \int_{-\infty}^{\infty} f(t) \cdot f(-\tau - t) dt$$

If $$\int_{-\infty}^{\infty} f(t) \cdot f(\tau - t) = F(\tau)$$

is set, the above formula becomes F($\tau$)–F(–$\tau$). What is crucial herein is that the auto-correlation function is an even function. Consequently, F($\tau$)=F(–$\tau$), such that the circuit output always becomes zero.

The reason F($\tau$) becomes an even function is now explained. The auto-correlation function represents the degree by which a crest h delayed by $\tau$ is influenced by another crest a in FIG. 7A.

In another aspect, assuming that time $\tau$ has elapsed, the auto-correlation represents the degree by which a crest a' having a lead of $\tau$ is influenced by a crest b' as shown in FIG. 7B. Since the calculation formula is represented by the product of the two crests, such "degree of influence" is of an equal value, so that the function becomes an even function.

If bi-level conversion is made, the correlation function represents the degree by which the crest d lagging by $\tau$ is influenced by the crest c in FIG. 7C, and also the degree by which the crest c' leading by $\tau$ is influenced by the crest d'. Since the crest d' is "0" by bi-level conversion, the correlation value for FIG. 7D is "0".

That is, by bi-level conversion, it can be seen the degree by which the target crest (side-lobe) of d is influenced by a crest (main spot) of c. The above accounts for carrying out the bi-level conversion. The multiplication circuit becomes redundant and the hardware becomes simpler in structure.

Figure 8:
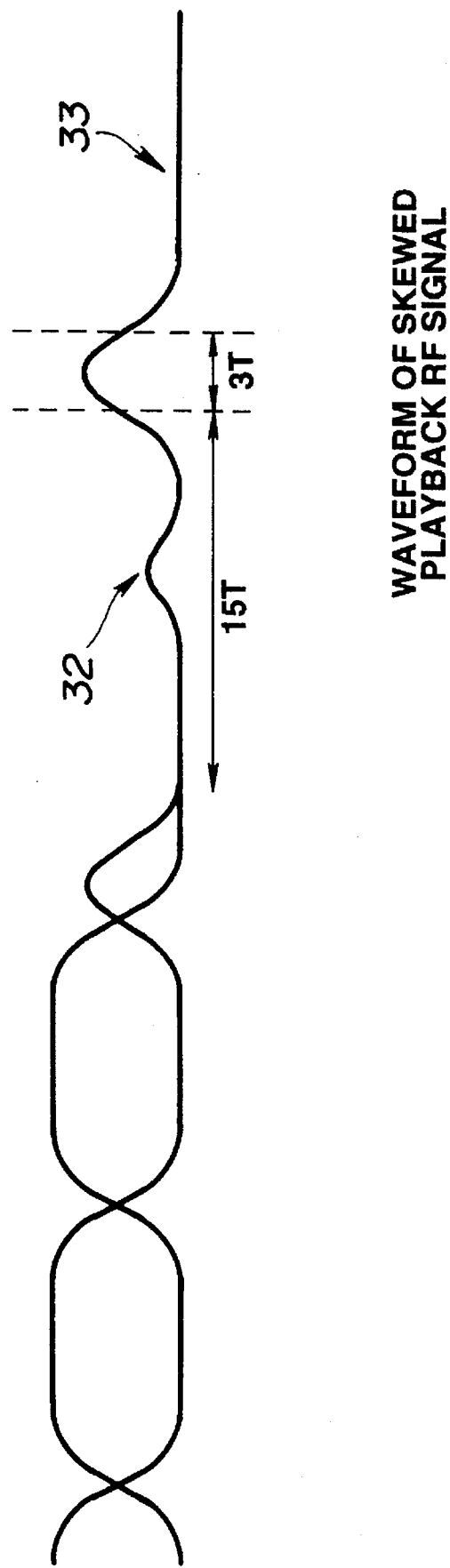
FIG. 8 is a graph showing the waveform of the playback RF signal when the optical disc is skewed.

The state in which the optical disc is skewed is explained by referring to FIG. 8.

Figure 9:
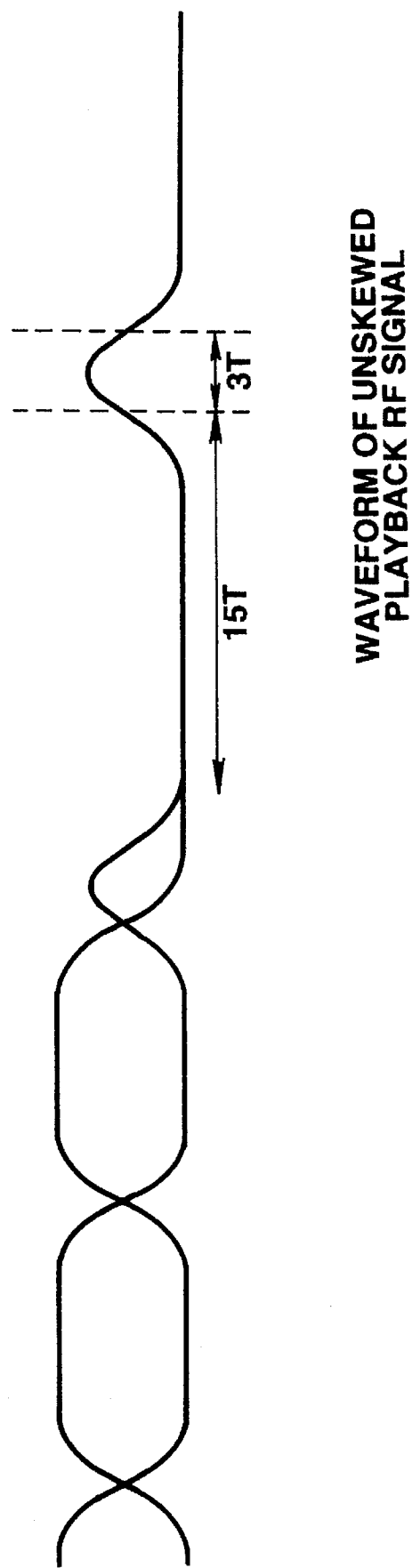
FIG. 9 is a graph showing the waveform of the playback RF signal when the optical disc is not skewed.

If there is a tilt or skew in the optical disc 1, there is produced at a position of a pre-fixed distance 32 from a center position 31 of the main light spot in the playback waveform a response waveform by the side lobe of the light spot corresponding in size to the skew quantity, as shown in FIG. 8. FIG. 8 shows the situation in which the response waveform by the side lobe is produced at the position 32 preceding the main light spot on the information track. If the direction of tilt of the optical disc 1 is reversed from that shown in FIG. 8, the response waveform by the side lobe of the light spot is produced at a position 33 backwardly of the main light spot on the information track. FIG. 9 shows, for comparison sake, the state in which the optical disc 1 is not skewed.

In an actual waveform, the input waveform is basically the superimposition of these patterns. Consequently, if the correlation calculation is carried out with the waveform of the playback RF signals shifted from the waveform of the RF signals converted into the bi-level signals by a distance equal to the distance between the main light spot and the side lobe, the value of the correlation is changed in proportion to the size of the side lobe. Thus the skew quantity calculating circuit 4 has correlation detection means comprising the polarity changeover circuit 11 and the LPF 18 and another correlation detection means comprising the polarity changeover circuit 14 and the LPF 17.

The distance the produced side lobe is displaced from the main light spot is determined by the constants of the optical system. Thus, if the value τ is calculated from the distance between the position of side lobe generation and the main light spot and the linear velocity of disc rotation, and the delay circuit 11 and the delay circuit 12 are accordingly designed, an output signal of the LPF 19 indicates on which side of the main light source the side lobe is produced, and which is the size of such side lobe, that is the quantity of skew of the optical disc.

Meanwhile, the following equation holds for the above observation:

$$\tau = \text{(distance between the position of side lobe generation and the position of the main light spot)/(linear velocity by disc rotation)}$$

On the other hand, since the quantity τ is determined by the above equation, irrespective of the quantity of skew, that is the disc tilt, it may be pre-set to a desired value.

With the above-described optical disc reproducing apparatus, employing the skew quantity calculating circuit 4, the disc tilt can be accurately calculated from the playback RF signals without the necessity of employing a skew sensor as conventionally. The quantity of skew as found by the skew quantity calculating circuit 4 represents the residue of correction performed by the optical disc skew correcting device 8, as described above. An inverted signal of the residue can be used for driving the optical disc skew correcting device 8 in a direction of canceling the residue. Since the noise component of the output of the skew quantity calculating circuit 4 and the skew fluctuations in the high-frequency range can be removed by integrating the inverted residue signal from the polarity inverting circuit 5 by the integrating circuit 8, it is possible for the present optical disc reproducing apparatus to carry out stable skew correction. Besides, since the skew sensor as employed previously may be dispensed with, the optical disc reproducing apparatus may be reduced in size and weight.

Meanwhile, with the present optical disc reproducing apparatus, an absolute value of the side lobe magnitude is not necessarily required for detecting the quantity of skew. If non-symmetry before and at back of the peak is produced, it becomes possible to correct the tangential skew of the optical disc. Consequently, there is no problem raised if the distance as calculated from the delay time introduced by the delay circuits 12, 13 and the linear velocity by disc rotation is lesser than the distance between the peak of the main light spot and the width of the side lobe crest. Thus it is not always necessary to set the delay by the delay circuits 12, 13 so as to be strictly equal to the above-mentioned value of τ. Although it is necessary to set the delay introduced by the delay circuit 12 so as to be equal to that introduced by the delay circuit 13 in order to detect non-symmetry before and after the peak, it is possible to detect the tangential skew of the optical disc 1 even if the absolute value of the delay is slightly deviated from the value of τ.

Figure 10:
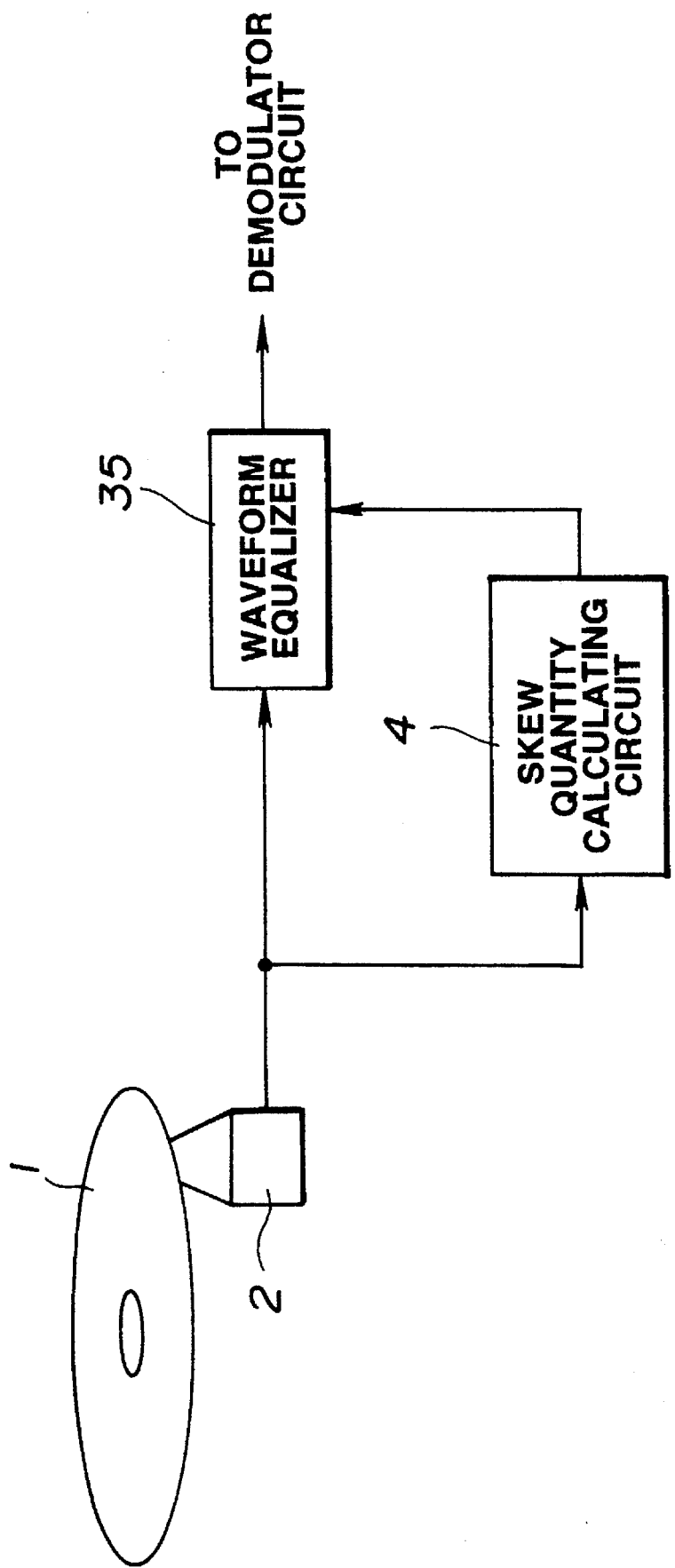
FIG. 10 is a schematic block diagram showing an arrangement of another embodiment of the optical disc reproducing method and apparatus according to the present invention.

FIG. 10 shows a modification of the method and apparatus for reproducing an optical disc according to the present invention.

Figure 4:
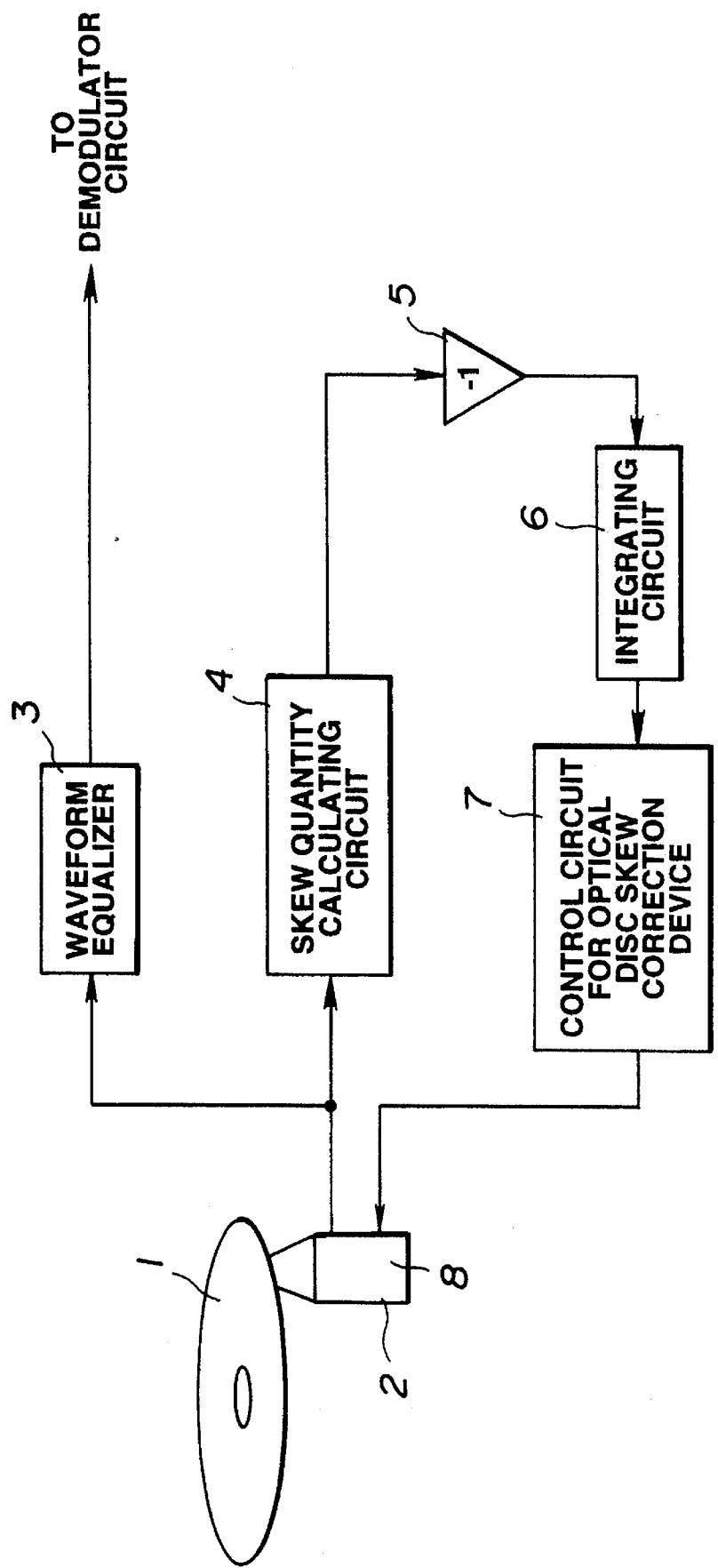
FIG. 4 is a schematic block diagram showing an optical disc reproducing apparatus according to the present invention.

The modification shown in FIG. 10 is directed to an optical disc reproducing apparatus in which information signals recorded on the optical disc 1 are reproduced at the same time as the quantity of skew is corrected using the playback signals of the optical disc 1. The constituent elements irrelevant to the present invention are omitted from the drawing, while the components similar to those shown in FIG. 4 are denoted by the same reference numerals and the corresponding description is omitted for simplicity.

The information signals recorded on the optical disc 1 are read out by the optical pickup 2. An output of the optical pickup 2 is inputted to a waveform equalizer 35 and to the skew quantity calculating circuit 4. Although the skew quantity calculating circuit 4 is configured similarly to that shown in FIG. 5, an output signal of the calculating circuit 4 is supplied to a tap coefficient control circuit of the waveform equalizer 35 which will be explained subsequently.

Figure 11:
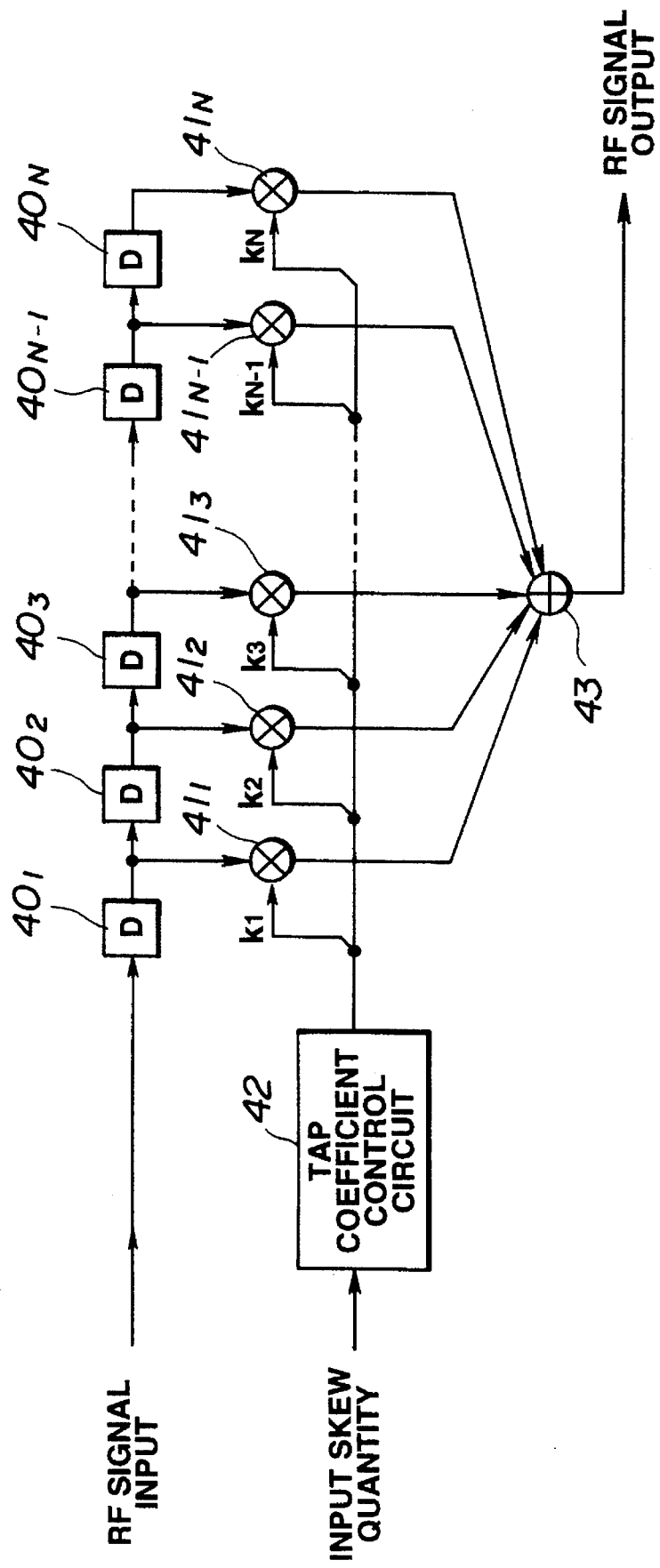
FIG. 11 is a schematic block diagram showing an arrangement of a waveform equalizer 35 of the embodiment shown in FIG. 10.

The waveform equalizer 35 is configured as shown in FIG. 11.

The waveform equalizer 35 is a finite impulse response filer (FIR filter) having N taps. The input RF signals from the optical disc 1 are transmitted through N stages of delay elements, that is, N delay elements $40_1, 40_2, 40_3, \ldots, 40_{N-1}, 40_N$, connected in cascade. Outputs of the delay elements $40_1, 40_2, 40_3, \ldots, 40_{N-1}, 40_N$ are supplied to the next delay element, while being supplied to multipliers $41_1, 41_2, 41_3, \ldots, 41_{N-1}, 41_N$. In the multipliers $41_1, 41_2, 41_3, \ldots, 41_{N-1}, 41_N$, outputs of the delay elements $40_1, 40_2, 40_3, \ldots, 40_{N-1}, 40_N$ are multiplied by tap coefficients $k_1, k_2, k_3, \ldots, k_{N-1}, k_N$ supplied from a tap coefficient control circuit 42. Output signals of the multipliers $41_1, 41_2, 41_3, \ldots, 41_{N-1}, 41_N$ are supplied to an additive node 43. The total sum of the output signals represents an RF playback RF signal output.

It is possible with the FIR filter to implement a variety of characteristics by suitably selecting its tap coefficients. The optical disc 1 is reproduced for a variety of previously applied different quantities of skew and optimum values of the tap coefficients are previously learned for the resulting playback signals. Such learning can be made in a known manner with the aid of a least mean square (LMS) algorithm. These coefficients are stored in a tap coefficient control circuit 42 in association with skew quantity signals obtained by the skew quantity calculating circuit 4 and the tap coefficients $k_1, k_2, k_3, \ldots, k_{N-1}, k_N$ are supplied to pre-set ones of the multipliers $41_1, 41_2, 41_3, \ldots, 41_{N-1}, 41_N$. Thus it becomes possible to correct waveform distortion in the playback RF signals produced by skew.

Figure 12:
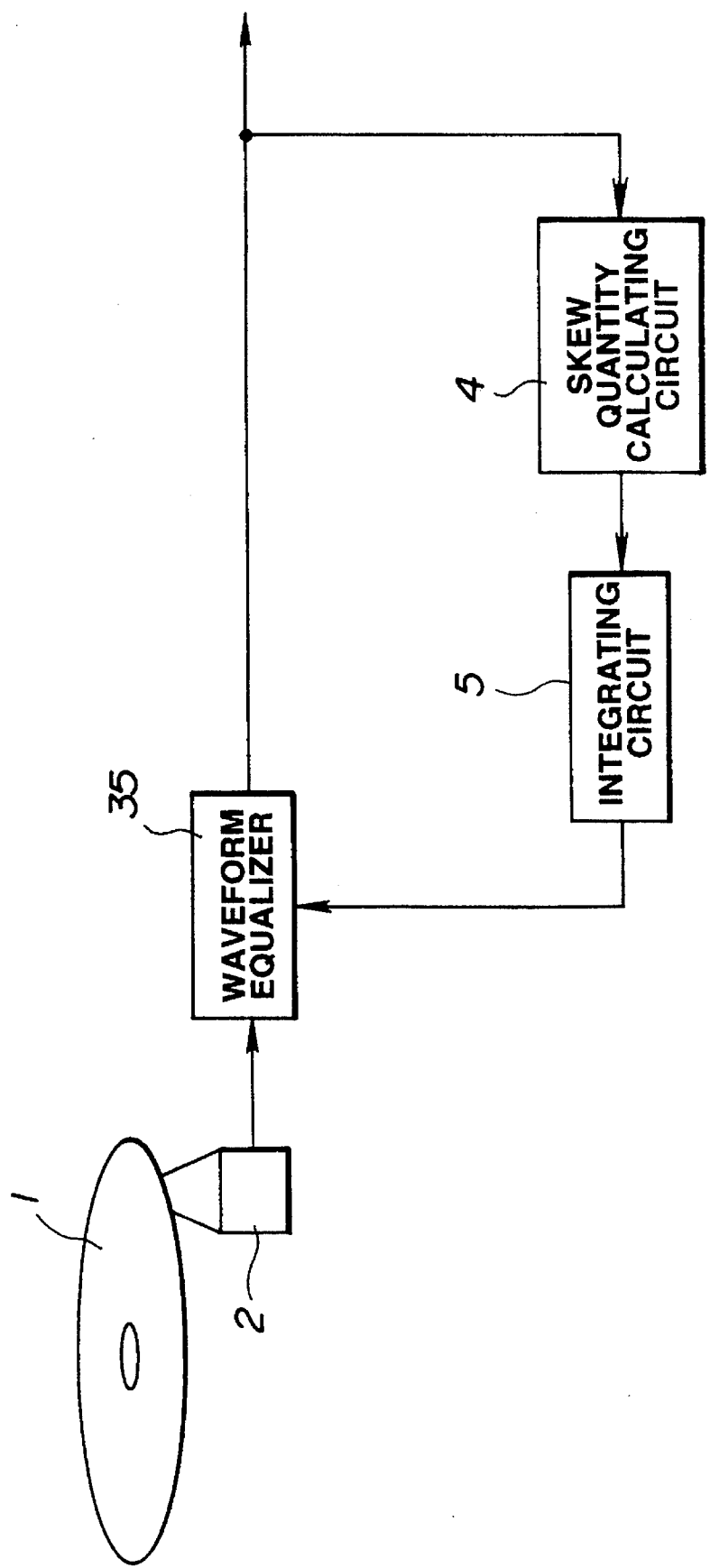
FIG. 12 is a schematic block diagram showing an arrangement of a further embodiment of the optical disc reproducing method and apparatus according to the present invention.
Figure 13:
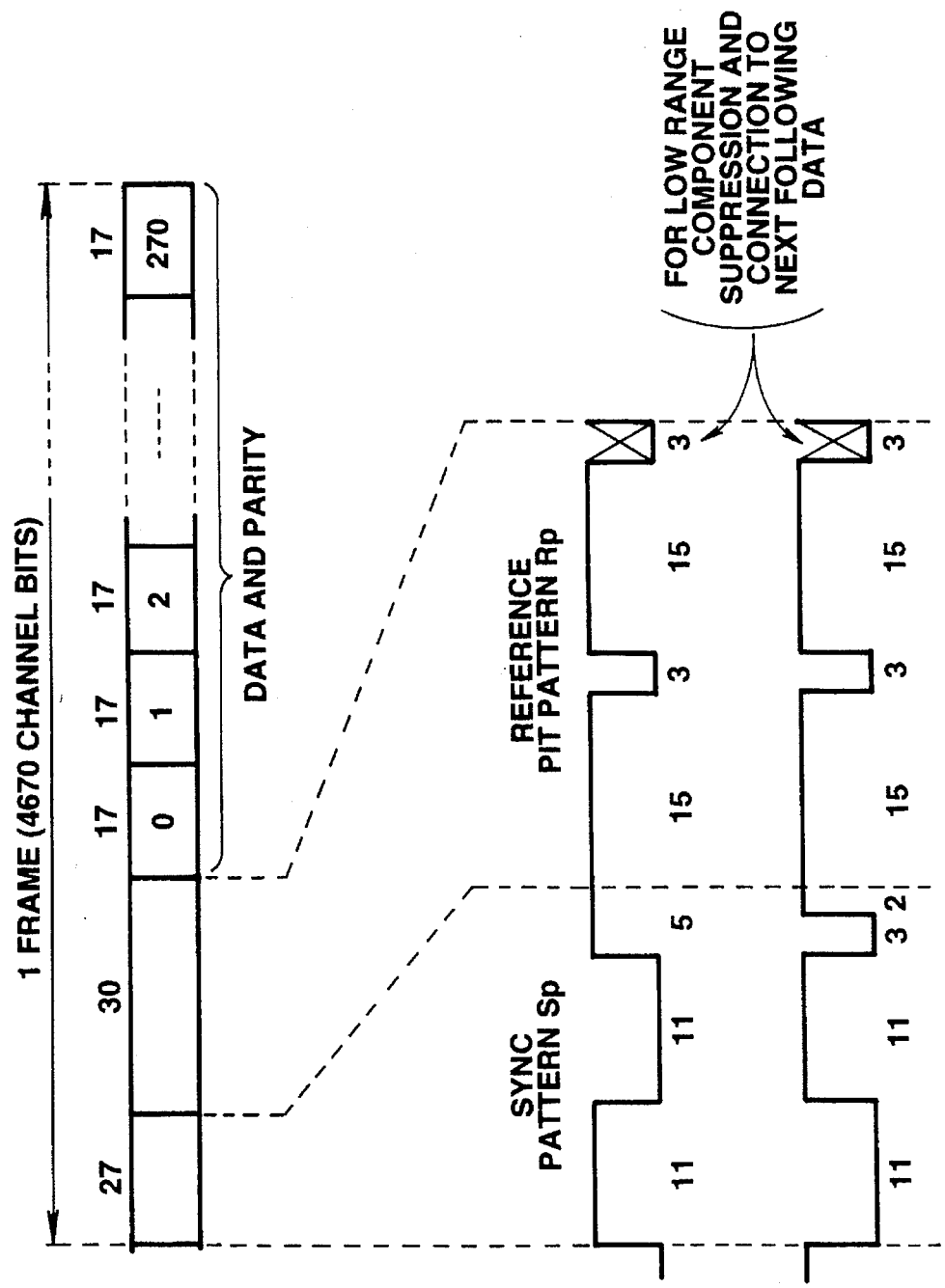
FIG. 13 illustrates the construction of a frame of signals recorded on an optical disc.

FIG. 12 shows a further modification of the method and apparatus for reproducing an optical disc according to the present invention.

The modification shown in FIG. 12 is directed to an optical disc reproducing apparatus in which information signals recorded on the optical disc 1 are reproduced at the same time as the quantity of skew is corrected using the playback signals of the optical disc 1. The constituent elements irrelevant to the present invention are omitted from the drawing, while the components similar to those shown in FIG. 4 are denoted by the same reference numerals and the corresponding description is omitted for simplicity.

The information signals recorded on the optical disc 1 are read out by the optical pickup 2. An output of the optical pickup 2 is supplied to a waveform equalizer 35. An output of the waveform equalizer 35 is supplied not only to a demodulating circuit, not shown, but also to the skew quantity calculating circuit 4. An output of the skew quantity calculating circuit 4 is supplied via the integration circuit 5 to a tap coefficient control circuit of the waveform equalizer 35. The waveform equalizer 35 may be configured as an FIR filter shown in FIG. 11, as in the embodiment shown in FIG. 10. Similarly to the tap coefficient control circuit shown in FIG. 10, the tap coefficient control circuit of the present embodiment has stored therein tap coefficients previously obtained by learning so that the tap coefficients stored therein will be supplied to the respective multipliers responsive to input skew quantity input signals.

The system comprising the waveform equalizer 35, skew quantity calculating circuit 4 and the integrating circuit 5 constitutes a first-order integration negative feedback channel. That is, the quantity of skew obtained after correcting the waveform distortion in the playback RF signals caused by skew represents the residue of the correction performed by the skew quantity calculating device 8. A signal representing such residue is supplied to a tap coefficient control circuit for controlling the tap coefficients so that characteristics of the waveform equalizer 35 will be changed in a direction of canceling the produced residue. In addition, the residue signal is integrated by the integrating circuit 5 for removing noise components in the output of the skew quantity calculating circuit or skew fluctuations in the high frequency range for performing stable skew correction.

The method and apparatus for reproducing information signals from the optical disc according to the present invention may be designed to detect the quantity of skew from the optical disc as later explained for reproducing information signals.

The optical disc has recorded thereon data strings comprising digitized audio or video signals modulated in accordance with pre-set modulation systems, such as non-return-to-zero-inverse (NRZI). That is, the 8-bit information is converted into the 17-bit information inclusive of margin bits and transition between "1" and "0" occurs each time "1" appears in the modulated bit string. The data or the data string obtained by EFM and NRZI are herein termed channel bits or channel bit strings, respectively.

The channel bit strings are recorded along the spirally extending information track 12 shown in FIG. 1 as optically readable pits, wherein the channel bits "1" and "0" are associated with the pits and the mirrors, that is non-recorded regions, respectively.

The information on the optical disc is divided into pre-set length units known as frames. In the leading end of each frame is recorded a synchronization pattern Sp which is not present in the EFM table and is formed by longer pits so that it can be detected in stability. Consequently, the synchronization pattern Sp can be used as the timing reference for a variety of processing operations.

Next to the synchronization pattern Sp is formed a reference pit pattern Rp comprising a pit region 55 of a pre-set length and a reflective region or a mirror region 56 of a pre-set length, as shown in FIG. 14. The pit region 55 diffracts the light radiated on the optical disc, while the mirror region directly reflects the radiated light. The reference pit pattern Rp may be designed by forming the mirror region 56 between two pit regions 55, as shown in FIG. 14, or by forming the pit region 56 between two mirror regions 55, as shown in FIG. 15. Detection of the quantity of skew when reproducing the optical disc employing the reference pit pattern Rp shown in FIG. 14 is now explained.

With the reference pit pattern Rp shown in FIG. 14, the pre-set length of the two pit regions 55, 55 is set to 15T or longer, while the mirror region 56 sandwiched between these two pit regions 55, 55 is set to 3T. In such reference pit pattern Rp, the mirror region 16 between the longer pit regions 55 may be regarded as being a lone pattern.

The reason of setting the pre-set lengths of one and the other regions of the reference pit patterns Rp to 15T or more and to 3T is as follows:

The intensity distribution of the diffracted image known as an airy ring shows that the radius dm of a beam spot equivalent to the 0'th order light of the beam may be represented by $$dm = 1.22 \cdot \lambda / (2 \cdot NA) \quad (5)$$

If the optical disc is skewed during playback, the side lobe indicating the first-order diffracted light generated in the beam spot is produced at a position represented by an equation $$dp = 1.64 \cdot \lambda / (2 \cdot NA) \quad (6)$$

wherein dp denotes the distance from the beam spot center.

On the other hand, the distance dn of a dark spot present on the outer side of the first-order diffracted light from the beam spot center is represented by an equation $$dn = 2.23 \cdot \lambda / (2 \cdot NA) \quad (7)$$

If, when two reference pit pattern Rp each made up of two pit regions 55, 55 and the mirror region 16 are recorded on the optical disc with a pre-set distance in-between, the disc is subjected to skew during reproduction, there is produced in the playback RF signal a response waveform associated with the side lobe, as the first-order diffracted light, before the response from the main spot of the 0th order diffracted light. If the distance between the two patterns, represented in terms of dn shown by the equation (7), is 2·d or more, there is no possibility of overlapping of the response waveforms by the first-order diffracted light from the before response from the main spot of the 0'th order diffracted light. For realizing the lone pattern in the strict sense of the term, it is necessary for the length of a pattern formed by the other pattern, that is a distance between the front and back patterns, be $4.46 \cdot \lambda/(2 \cdot NA)$.

However, if the distance between the two patterns is larger than $$2 \cdot dp = 3.28 \cdot \lambda / (2 \cdot NA) \quad (8)$$

the responses of the side lobes by the first-order diffracted light are not overlapped and may be detected in a state comparable to the lone side lobe.

Although the reference pit pattern Rp is applied to the optical disc having the EFM modulated information recorded thereon, the minimum distance of transition of the recorded channel bit strings is 3T. For reproducing the optical disc, it is a requirement in general that the signals of repetition of the minimum distance of transitions be reproduced with sufficient amplitude.

Scrutinizing into the modulation transfer function (MTF) which is the optical transfer function, the amplitude of the playback RF signal becomes completely zero when the recorded wavelength, which is equal to twice the minimum distance between transitions, becomes equal to $\lambda/(2NA)$. Consequently, the relation between an optical constant and the size of the channel bit string generally satisfies $$2.3T > \lambda/(2 \cdot NA) \quad (9)$$

or $$2.3T = 1.5 \cdot \lambda/(2 \cdot NA) \quad (10)$$

in view of practical applicability.

Thus the width of a window representing the signal extraction interval is given by $$T = 0.25 \cdot \lambda/(2 \cdot NA) \quad (11)$$

The length of each of two pit regions 55, arranged with the interval of 3T of the mirror region 56 in-between, is to be 15T or longer, as stated above. If the length of 15T or longer is to be found from the equation (11), we obtain $$15T = 3.75 \cdot \lambda/(2 \cdot NA) \quad (12)$$

thus satisfying the equation (8).

If such optical disc is reproduced, it becomes possible for the optical disc reproducing apparatus to correctly detect the quantity of skew, which is the amount of tilt of the optical disc, and hence to read out correctly the information recorded on the optical disc.

What is claimed is:

1. A disc apparatus for reproducing information signal recorded on a disc-shaped recording medium comprising;
   (a) information readout means for reading out the information signal from said disc-shaped recording medium,
   (b) skew calculating means for calculating the quantity of skew of said disc-shaped recording medium by calculating the correlation between said information signal read out from said disc-shaped recording medium and a signal obtained on shifting said information signal a pre-set time, the skew calculating means including first delay means for delaying said information signal by said pre-set time,
   second delay means for further delaying an output of said first delay means by said pre-set time,
   means for converting an output signal of said first delay means into a bi-level signal and outputting said bi-level signal,
   first correlation calculating means for calculating the correlation between the information signal and the bi-level signal,
   second correlation calculating means for calculating the correlation between an output signal of the second delay means and the bi-level signal, and
   difference means for calculating a difference between a correlation value obtained by said first correlation means and a correlation value obtained by said second correlation means to obtain said quantity of skew, and
   (c) means for correcting the skew of said disc-shaped recording medium in accordance with the quantity of skew obtained by said skew calculating means.

2. The disc apparatus as claimed in claim 1 wherein
   said pre-set time is a quantity obtained by dividing the distance between a main light spot in the playback waveform and a side lobe resulting from the skew by a linear velocity of disc rotation.

3. The disc apparatus as claimed in claim 2 further comprising:
   polarity inverting means for inverting the polarity of the quantity of skew obtained by said skew calculating means,
   said disc-shaped recording medium being an optical disc, and said skew correcting means producing tilt in the optical axis in a direction of canceling the tilt of said optical disc.

4. The disc apparatus as claimed in claim 3 further comprising integration means for integrating the signal the polarity of which is inverted by said polarity inverting means.

5. The disc apparatus as claimed in claim 1 wherein said skew correcting means includes a correction optical element in an optical path of the light reflected from said optical disc, said correction optical element correcting an aberration by generating a coma aberration reversed from a coma aberration generated by the tilt of said optical disc.

6. The disc apparatus as claimed in claim 1 wherein said correction means comprises:
   waveform equalizing means for removing waveform distortion of said information signal, and
   tap coefficient control means for storing pre-set tap coefficients and for supplying said tap coefficients to said waveform equalizing means in accordance with said quantity of skew.

7. The disc apparatus as claimed in claim 6 wherein said waveform equalizing means comprises:
   N delay elements for delaying said information signal,
   N multipliers fed with said tap coefficients, and
   an additive node for adding output signals of said N multipliers together.

8. The disc apparatus as claimed in claim 7 wherein said tap coefficient control means finds optimum tap coefficients for the pre-skewed disc-shaped recording medium by a Least Means Square method for storage therein.

9. The disc apparatus as claimed in claim 8 wherein
   said pre-set time is a quantity obtained by dividing the distance between a main light spot in the playback waveform and a side lobe resulting from the skew by a linear velocity of disc rotation.

10. The disc apparatus as claimed in claim 7 wherein
    said skew quantity calculating means calculate the quantity of skew from information signals waveform-equalized by said waveform equalizing means, and the resulting skew quantity is integrated by integration means.

11. The disc apparatus as claimed in claim 10 wherein said tap coefficient control means finds optimum tap coefficients for the pre-skewed disc-shaped recording medium by a Least Means Square method for storage therein.

12. The disc apparatus as claimed in claim 11 wherein said pre-set time is a quantity obtained by dividing the distance between a main light spot in the playback waveform and a side lobe resulting from the skew by a linear velocity of disc rotation.

13. A method for reproducing information signals recorded on said disc-shaped recording medium comprising the steps of:

a first step of reading out the information signal from said disc-shaped recording medium, a second step of calculating the quantity of skew of said disc-shaped recording medium by calculating the correlation between said information signal read out from said disc-shaped recording medium and a signal obtained on shifting said information signal a pre-set time, wherein said second step comprises a first delay step for delaying said information signal by said pre-set time, a second delay step for further delaying an output of said first delay step by said pre-set time, a bi-level step for converting an output signal of said first delay step into a bi-level signal and outputting said bi-level signal, a first correlation calculating step for calculating the correlation between the information signal and the bi-level signal, a second correlation calculating step for calculating the correlation between an output signal of the second delay step and the bi-level signal, and a difference calculating step for calculating a difference between a correlation value obtained by said first correlation step and a correlation value obtained by said second correlation step to obtain said quantity of skew, and a third step of correcting the skew of said disc-shaped recording medium in accordance with the quantity of skew obtained in said second step.

14. The method as claimed in claim 13 wherein said pre-set time is a quantity obtained by dividing the distance between a main light spot in the playback waveform and a side lobe resulting from the skew by a linear velocity of disc rotation.

15. The method as claimed in claim 14 further comprising:

a fourth step of inverting the polarity of the quantity of skew obtained by said third step, and wherein said disc-shaped recording medium is an optical disc, and the optical axis is tilted in said third step in a direction of canceling said skew.

16. The method as claimed in claim 15 further comprising the step of integrating a polarity-inverted signal from said fourth step.

17. The method as claimed in claim 13 wherein said third step comprises:

a waveform equalizing step for removing waveform distortion of said information signal, and a tap coefficient control step for storing pre-set tap coefficients and for supplying said tap coefficients to said waveform equalizing step in accordance with said quantity of skew.

18. The method as claimed in claim 17 wherein said waveform-equalizing step comprises:

an N-stage-delaying step of delaying the information signal by N stages, a multiplication step of multiplying the tap coefficients by the delayed information signals, and an addition step of adding the multiplied information signals together.

19. The method as claimed in claim 18 wherein said tap coefficients are found by the Least Means Square method for a pre-skewed disc-shaped recording medium.

20. The method as claimed in claim 13 wherein said second step calculates the quantity of skew from the information signal waveform-equalized by said waveform-equalizing step, and wherein the resulting quantity of skew is integrated in said fourth step.

21. The method as claimed in claim 20 wherein said tap coefficients are previously found by the Least Means Square method for a pre-skewed disc-shaped recording medium.

* * * * *